United States Patent [19]

Savoye

[11] Patent Number: 4,661,854
[45] Date of Patent: Apr. 28, 1987

[54] TRANSFER SMEAR REDUCTION FOR CHARGE SWEEP DEVICE IMAGERS

[75] Inventor: Eugene D. Savoye, Lancaster, Pa.
[73] Assignee: RCA Corporation, Princeton, N.J.
[21] Appl. No.: 813,423
[22] Filed: Dec. 26, 1985
[51] Int. Cl.[4] .............................................. H04N 3/14
[52] U.S. Cl. .................................................. 358/213
[58] Field of Search ........................ 358/213, 212, 167
[56] References Cited

U.S. PATENT DOCUMENTS

| | | | |
|---|---|---|---|
| 4,366,503 | 12/1982 | Terakawa et al. | 358/213 |
| 4,380,755 | 4/1983 | Endlicher et al. | 358/213 |
| 4,498,105 | 2/1985 | Crawshaw | 358/213 |
| 4,539,597 | 9/1985 | Kinoshita et al. | 358/213 |
| 4,584,609 | 4/1986 | Klein et al. | 358/213 |

OTHER PUBLICATIONS

A paper entitled "A ½ Format Color Image Sensor with 485×510 Pixels" (at pp. 91-94 of the Digest of Papers presented at the International Electronic Imaging Exposition and Conference, Oct. 1985 in Boston, Mass., sponsored by the Society of Photographic Scientists and Engineers and the Institute for Graphic Communication, Inc., Yamawaki et al.
A paper entitled "A 480×400 Element Image Sensor with a Charge Sweep Device" at pp. 100-101 of the Digest of Papers presented at the IEEE International Solid-State Circuits Conference, Feb., 1985, Kimata et al.

Primary Examiner—Gene Z. Rubinson
Assistant Examiner—Stephen Brinich
Attorney, Agent, or Firm—Eugene M. Whitacre; Peter M. Emanual; James B. Hayes

[57] ABSTRACT

Significant reductions in transfer smear for charge sweep device imagers is made possible by performing the charge sweep operation during only the line retrace period of the operating cycle of the imager. Complete elimination of transfer smear is then possible by using an optical means for blocking the imager from incident illumination during said line retrace periods.

14 Claims, 7 Drawing Figures

TRANSFER SMEAR REDUCTION FOR CHARGE SWEEP DEVICE IMAGERS

FIELD OF THE INVENTION

The present invention relates to reducing the effects of transfer smear in charge sweep device imagers.

FIG. 1 illustrates a charge coupled device (CCD) type of solid-state imager known as a charge sweep device (CSD). Such a device is described by M. Kimata, et al. in the paper entitled "A 480×400 Element Image Sensor with A Charge Sweep Device" appearing on pages 100 and 101 of the 1985 *IEEE International Solid State Circuits Conference Digest of Technical Papers.*

Briefly, the CSD imager includes a plurality of photoresponsive charge collecting regions (pixels) 10 fabricated by, for example, the deposition of electrodes over a major surface of a semiconductor substrate 11. Charge collecting regions 10 are arranged in an array of horizontal rows and vertical columns. A plurality of CCD shift registers 12 buried in semiconductor substrate 11 (and therefore illustrated by dashed lines in FIG. 1) is interleaved with the columns of charge collecting regions 10 so that one CCD shift register 12 is alongside a respective column of charge collecting regions 10. Stages of CCD shift registers 12 along a row, selectively receive photoresponsive charge packets developed from respective adjacent charge collecting regions 10 of the same row. In response to clock signals, the row of charge packets is transferred ("swept") through to the ends of the columns of shift registers 12 and into separate stages of a CCD output line register 14. CCD output line register 14 is then clocked so as to serially provide the row of charge packets to a charge sensing stage 16. Charge sensing stage 16 converts the photoresponsive charge packets into video signal samples in accordance with one of several well-known charge sensing techniques, such as correlated double sampling.

CCD shift registers 12 are relatively narrow as compared with the vertical CCD shift registers of the well known standard interline transfer device type of imager. The relatively narrow shift register area of the CSD type of imager allows more area for collecting photoresponsive charge and results in improved sensitivity and/or image resolution when compared with the standard interline transfer device imager. However, due to the low charge handling capacity of narrow CCD shift registers 12, when a photoresponsive charge packet is transferred into a corresponding stage of CCD shift register 12, it spreads out over several adjacent CCD shift register stages. Thus, as previously noted, the CSD imager of FIG. 1 is operated so that only one row of photoresponsive charge packets is transferred at a time into CCD shift registers 12.

More specifically, with respect to FIG. 1, the CSD imager includes a transfer gate (TG) scanner 18 for sequentially providing row selection pulses to lines a, b . . . n, respective ones of said lines being connected to respective ones of said rows of gate electrodes 20 which cross the charge transfer channels of CCD shift registers 12. The row selection pulses transfer one row of photoresponsive charge packets at a time from collecting regions 10 into CCD shift registers 12 during each line retrace interval. Waveform 1 of FIG. 7 illustrates the line trace and retrace intervals of a video signal. Waveform 2 of FIG. 7 illustrates the occurrence of a row selection pulse a', which is applied to line "a" during a first line retrace interval. Respective ones of additional row selection pulses b' . . . n' occur in respective ones of the following line retrace intervals and are applied to respective ones of the remaining lines b . . . n. Gate electrodes 20 are also connected by lines a, b . . . n to a CSD scanner 22 which supplies clocking signals to all of lines a, b . . . n during the line trace intervals for controlling the clocking of CCD shift registers 12 during the line trace intervals. Waveform 3 of FIG. 7 is illustrative of clocking pulses applied to lines a, b . . . n by CSD scanner 22 during one of the line trace intervals. These clocking signals may comprise polyphase clocking signals and transfer the row of charge packets through shift registers 12 in a well known manner and accumulate them under a storage gate electrode 24 which crosses the ends of CCD shift registers 12. Scanners 18 and 22 are each operated with tri-state output drive circuitry so as to permit the sharing of gate electrodes 20. During these time periods (line trace intervals), a storage control gate electrode 26 maintains a potential barrier between storage gate electrode 24 and CCD output line register 14 while register 14 is being clocked to serially read out a previously received row of charge packets to charge sensing stage 16. During the line retrace intervals, just before the next row of photoresponsive charge packets is transferred from charge collecting regions 10 into CCD shift registers 12, storage control gate electrode 26 is pulsed to lower the barrier between storage gate electrode 24 and CCD output line register 14. As a result, the row of charge packets is transferred in parallel into respective stages of CCD output line register 14. Clocking of CCD output line register 14, which is halted during the line retrace intervals, is resumed during the line trace intervals so as to serially transfer the received row of charge packets to charge sensing stage 16.

Unfortunately, since the imager remains illuminated during the time period when the photoresponsive charge packets are being transferred through CCD shift registers 12 and accumulated under storage gate electrode 24, additional photoresponsive charges enter CCD shift registers 12 during this transfer period which are also accumulated under storage gate electrode 24. These additional photoresponsive charges combine with, and therefore contaminate, the charge packets derived from collecting regions 10. This results in the well-known phenomenon of transfer smear contamination.

SUMMARY OF THE INVENTION

In accordance with the principles of the present invention, a CSD imager is operated so as to transfer and accumulate the charge packets developed by the collecting regions into the output line register only during line retrace periods. Due to the relatively short transfer and accumulation time during the line retrace period, as compared with the prior art line trace transfer and accumulation time, transfer smear is greatly reduced.

In accordance with a further aspect of the invention, a shutter is provided for blocking the imager from incident illumination during the line retrace periods and not blocking the imager during the line trace periods.

BRIEF DESCRIPTION OF THE DRAWINGS

In the FIGURES, corresponding elements have the same reference numbers.

DESCRIPTION OF THE PREFERRED EMBODIMENT

Figure 1:
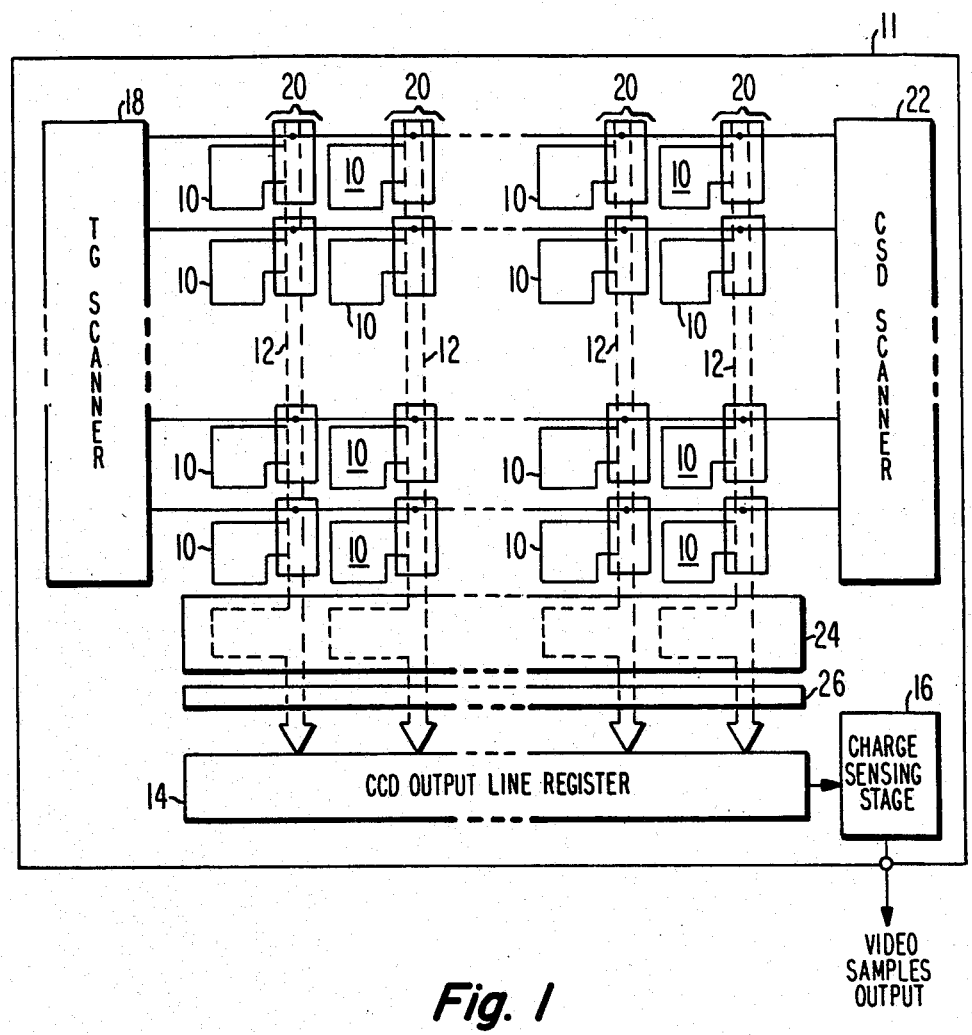
FIG. 1 illustrates, in block diagram form, the architecture of the prior art CSD imager already described.
Figure 2:
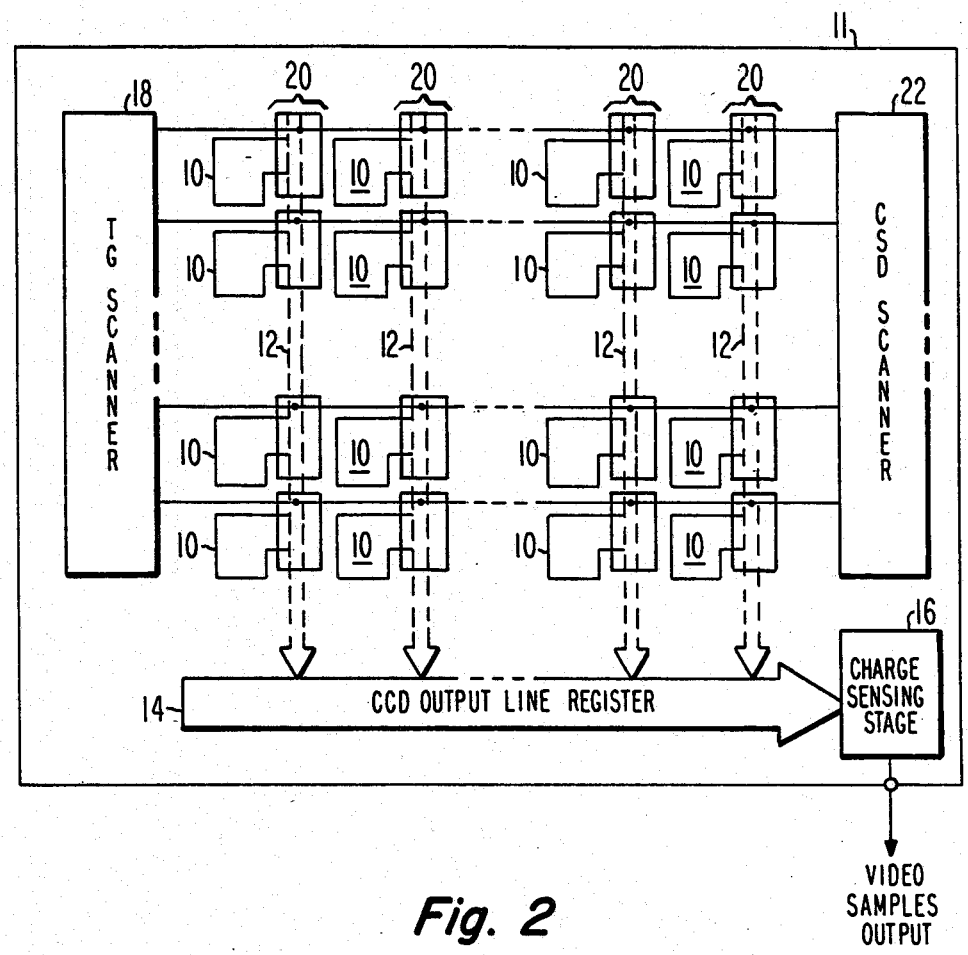
FIG. 2 illustrates, in block diagram form, the architecture of a CSD imager constructed in accordance with the invention.

In the arrangement of FIG. 2, in accordance with the invention, charge transfer for collecting regions 10 is confined to the time duration of the line retrace interval. Accordingly, the selected row of charge packets 10 is transferred into CCD shift registers 12 via row selection pulses such as previously described with reference to FIG. 1 in conjunction with waveform 2 of FIG. 7 and then swept directly into corresponding stages of CCD output line register 14 via clocking signals such as 5 or 6 illustrated in waveform 4 of FIG. 7. The transfer and sweeping operations both take place within each line retrace interval. Forward clocking of register 14, via clocking signals such as illustrated by waveform 3 of FIG. 7, serially transfers the row of charge packets to charge sensing stage 16 during the following line trace interval. Thus, storage gate electrode 24 and storage control gate electrode 26 of the prior art CSD imager and associated clock signals for operating these gate electrodes are not required. This simplifies the CSD architecture and clocking signal connections over those of the prior art. Furthermore, since the charge packet transfer time through CCD shift registers 12 is reduced, there is a corresponding reduction in transfer smear.

Figure 3:
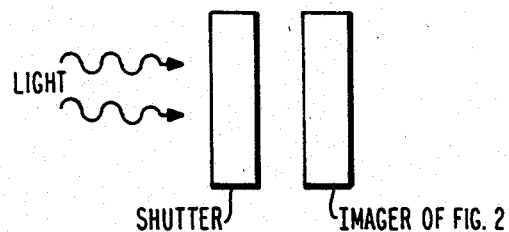
FIG. 3 illustrates a line-rate light blocking optical shutter in combination with the imager of FIG. 2.

In accordance with a further aspect of the invention, since the transfer time interval is limited to the line retrace interval, it is possible to include a means for blocking the imager from incident illumination during the transfer interval so as to substantially prevent the generation of any transfer smear. Line-rate light blocking means could not be practically used in the prior art imager of FIG. 1 since CCD shift registers 12 transferred the rows of charge packets during the line trace intervals. Although blocking the imager from illumination during the line trace intervals would prevent the generation of transfer smear, it would also substantially prevent the collection of any photoresponsive charge by collecting regions 10. Conventional light blocking means for an imager comprises, for example, a rotating light blocking shutter including transparent apertures therein. FIG. 3 illustrates a shutter positioned so as to block the imager of FIG. 2 from illumination during the line retrace intervals.

In the event that a means for blocking the imager from incident illumination at the line retrace interval rate is not desired, transfer smear can be substantially eliminated by differentially combining photoresponsive charge packets including transfer smear charges with charge packets of transfer smear only. Various ways to perform the differential combining are illustrated by FIGS. 4, 5 and 6.

Figure 4:
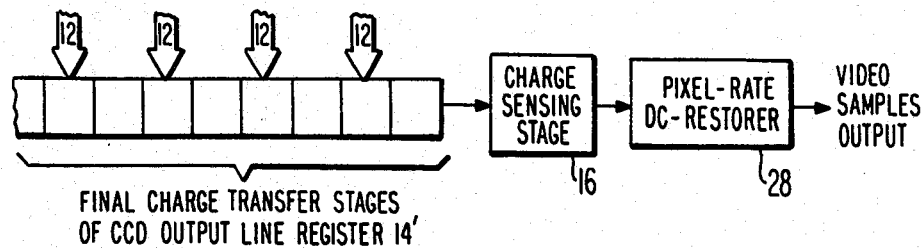
FIGS. 4 and 5 show alternative output register modifications that can be made to the FIG. 2 CSD imager for suppressing transfer smear in accordance with further aspects of the invention.
Figure 7:
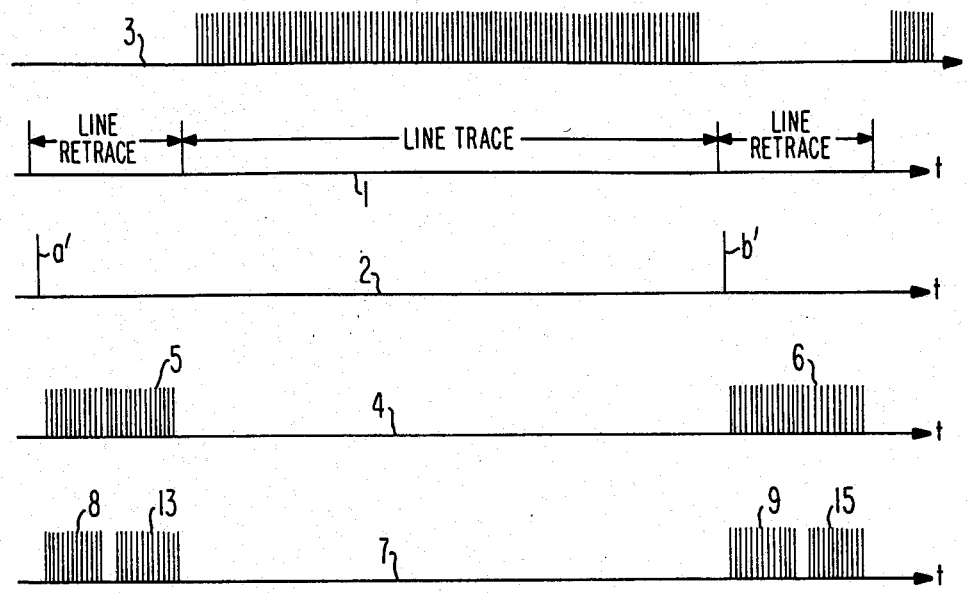
FIG. 7 illustrates waveforms useful in understanding FIGS. 1-5.

FIG. 4 accomplishes the differential combining of charge samples using a modified FIG. 2 imager. CCD output line register 14', has twice as many stages as there are CCD shift registers 12. Each CCD shift register 12 is positioned to load charge packets into alternate ones of the successive charge transfer stages of CCD output line register 14'. At the beginning of each line retrace interval a row selection pulse transfers photoresponsive charge packets from collecting regions 10 into shift registers 12 in the same manner as described with respect to FIG. 2 in conjunction with waveform 2 of FIG. 7. Clocking signals such as illustrated by 8 and 9 of waveform 7 of FIG. 7 cause said charge packets to be transferred through registers 12 and into respective stages of output line register 14' in one-half of each line retrace interval. After a row of photoresponsive charge packets (including transfer smear charge components) is loaded into output line register 14', output line register 14' is clocked forward one cycle. During the second half of each line retrace interval, clocking signals such as illustrated by 13 and 15 of waveform 7 of FIG. 7 are applied to shift registers 12 by CSD scanner 22, but transfer gate scanner 18 provides no row selection pulses to transfer gates 20 for transferring image-representative photoresponsive charge packets from charge collecting regions 10 into CCD shift registers 12. Thus, only transfer smear charges are accumlated by the forward clocking of CCD shift registers 12 and are collected in the alternate stages of CCD output line register 14'. Charge sensing stage 16 is followed by a DC-restorer circuit 28. During the following line trace interval, CCD output line register 14' is clocked forward at twice the normal line rate and charge sensing stage 16 alternately provides charge packets representative of the image-photoresponse which includes transfer smear followed by charge packets representative of transfer smear only. DC restorer 28 is operated to clamp the transfer-smear-only charge packets to a reference direct potential in response to pixel rate clamp pulses (not shown). DC restorer 28 receives the imager-representative charge packets including transfer smear when it is operated unclamped, thereby subtracting away the transfer smear charge packets from the image-representative charge packets including transfer smear. Thus, the video samples supplied from DC restorer 28 are substantially free of transfer smear. Alternative ways of differentially combining pairs of successive samples from charge sensing stage 16 are known and may be employed instead of the DC restore technique, such as directing each charge packet of the pair to a respective one of the differential inputs of a differential amplifier.

Figure 5:
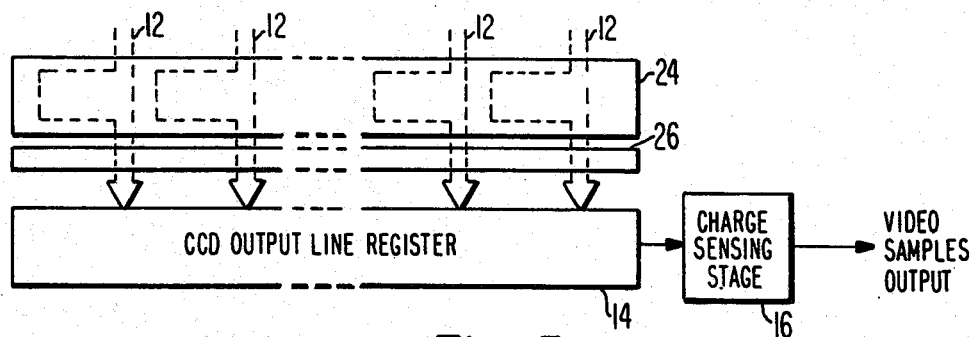

FIG. 5 shows another way of doing the differential combining of successive lines of samples in a modified version of the CSD imager of FIG. 2. In FIG. 5 storage gate electrode 24 and storage gate control electrode 26 similar to those of the FIG. 1 structure are included between the ends of CCD shift registers 12 of FIG. 2 and CCD output line register 14. The CSD imager of FIG. 5 operates similar to the one previously described with respect to FIG. 4 and in conjunction with waveforms 2 and 7 of FIG. 7 in that CCD shift registers 12 are operated at twice the normal transfer rate during the line retrace intervals. During the first half of each line retrace interval, a row of charge packets derived from charge collecting regions 10 and including transfer smear charges are accumulated in successive storage wells formed under storage gate electrode 24. Next, storage gate control electrode 26 is pulsed so as to transfer these charges into successive stages of CCD output line register 14. During the second half of the line retrace interval, CCD shift registers 12 are again clocked forward by CSD scanner 22, and, in the same manner as described with respect to FIG. 4, transfer gate scanner 18 provides no row selection pulses to transfer image-representative charge packets from a row of collecting regions 10 into CCD shift registers 12. This causes a row of transfer smear charges to be accumulated in the successive storage wells under storage gate electrode 24 during the second half of the line retrace interval. During the first half of the following line trace interval, CCD line register 14 is clocked forward at twice the normal pixel rate for causing the line of photoresponsive charge packets including transfer smear to be supplied to charge sensing stage 16. During the second half of this following line trace interval, storage gate control electrode 26 is pulsed so as to transfer the line of transfer smear charges into CCD output line register 14 and register 14 is clocked forward at twice the normal pixel rate so as to cause charge sensing stage 16 to supply a line of transfer smear video samples. Thus, during each line trace interval, the CSD imager sequentially supplies a line of video samples including transfer smear and an associated line of video samples representative of transfer smear only. Differential combining of these sequential lines can be accomplished as shown in FIG. 6 either in analog or digital form.

Figure 6:
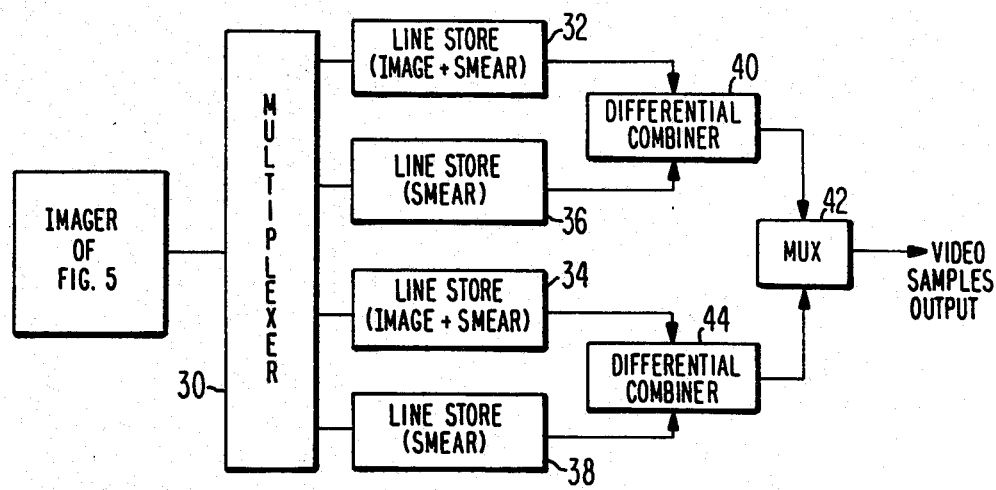
FIG. 6 is a block diagram of apparatus to be used in combination with the FIG. 5 CSD imager for suppressing transfer smear.

In FIG. 6, during alternate one-half line trace periods a multiplexer 30 writes lines of signal samples representing both image information and transfer smear supplied from the CSD imager of FIG. 5 into one of line stores 32 and 34, and writes lines of signal samples representative of transfer smear only into one of line stores 36 and 38. During the same trace interval, signal samples stored in the other ones of pairs of line stores 32 and 36 and 34 and 38 during the previous line are read out in parallel at the normal pixel scan rate to the respective ones of differential combiners 40 and 44. A multiplexer 42 selects the output of the selected differential combiner to supply the video output signal. Thus, during each line trace interval, the information stored in one pair of line stores 32 and 36 or 34 and 38 is being written into while the information stored in the other pair of line stores is being read out and combined to form the output signal.

What is claimed is:
1. CCD imager apparatus, comprising:
   a semiconductor substrate;
   a parallel array of CCD charge transfer channels formed on a major surface of said substrate;
   sets of gate electrodes formed on said substrate and crossing said CCD charge transfer channels for defining successive charge transfer stages in each of said CCD charge transfer channels and transfer gate electrodes for controlling the transfer of charge packets into said CCD charge transfer channels;
   a plurality of photoresponsive charge collecting regions formed in an array of rows and columns on said substrate, each charge collecting region being associated with a respective one of said CCD charge transfer channels;
   output means coupled to one end of each of said CCD charge transfer channel for collecting charge packets transferred from said CCD charge transfer channels and providing therefrom successive samples of a video signal said video signal having line trace and line retrace periods therein; and
   clock signal generating means for developing transfer signals which are applied to said transfer gate electrodes for causing transfer of photoresponsive charge packets from a selected row of said array of charge collecting regions into said CCD charge transfer channels during a line retrace interval, and for developing clocking signals which are applied during said line retrace interval to said sets of gate electrodes crossing said CCD charge transfer channels for transferring said selected row of photoresponsive charge packets through said CCD charge transfer channels and accumulating them in said output means.

2. Apparatus according to claim 1 wherein said output means comprises:
   a CCD output line register having successive charge transfer stages respectively loaded in parallel from ends of respective ones of said charge transfer channels; and
   charge sensing means having an input coupled to receive successive charge packets supplied from said CCD output line register and for developing from them successive video signal samples.

3. Apparatus according to claim 2 wherein said CCD output line register comprises:
   a CCD output line register having twice as many charge transfer stages as there are CCD charge transfer channels; and
   said clocking means causes a row of said charge packets tranferred from said collecting regions to be accumulated in alternate ones of the charge transfer stages of said CCD output line register during a first portion of said line retrace interval, and a row of charge packets substantially representative of only transfer smear to be accumulated in the remaining charge transfer stages of said CCD output register during a second portion of said line retrace interval.

4. Apparatus according to claim 3 further including:
   signal processing means coupled to receive said successive video signal samples and process successive samples in pairs so as to differentially combine a video signal sample including charge transferred from a charge collecting region with a video signal sample including charge not transferred from a charge collecting region.

5. Apparatus according to claim 4 wherein said signal processing means comprises:
   a DC-restorer circuit which is operated to clamp alternate ones of said successive video signal samples to a reference direct potential and not clamp the remaining ones of said successive video signal samples.

6. Apparatus according to claim 1 wherein said output means comprises:
   a storage gate electrode disposed over said one ends of said CCD charge transfer channels for forming respective charge storage stages for said CCD charge transfer channels;
   a CCD output line register having successive charge transfer stages respectively loaded in parallel from respective ones of said charge storage stages; and
   a storage control gate electrode formed on said substrate between said storage gate electrode and said CCD output line register for controlling the parallel loading of said CCD output line register;

said clock signal generating means supplying clocking signals to said CCD charge transfer channels for causing the accumulation of a row of photoresponsive charge packets transferred from said charge collecting regions into said charge storage stages formed by said storage gate electrode during a first portion of said line retrace interval and for supplying pulses to said storage gate electrode and storage control gate electrode to transfer charge packets from said charge storage stages into said CCD output line register and then supply clocking signals to said CCD charge transfer channels during a second portion of said line retrace interval for accumulating a row of charge packets not transferred from said charge collecting regions into said charge storage stages formed by said storage gate electrode.

7. Apparatus according to claim 6 further including:

means for differentially combining the row of charge packets stored in said CCD output line register with the row of charge packets stored in said charge storage stages formed by said charge storage electrode.

8. Apparatus according to claim 7 wherein said differential combining means comprises:

a multiplexer having an input coupled to the output of said CCD output line register and first and second outputs;

first and second line stores each having an input coupled to a respective one of the first and second outputs of said multiplexer, and an output; and a differential combiner coupled to the output of said first and second line stores, said clock signal generating means supplying clocking signals to said CCD output line register, said first and second line stores and said multiplexer for transferring said row of charge packets transferred from charge collecting regions from said CCD output line register into said first line store during a first portion of a line trace interval and for transferring said row of charge packets not transferred from said charge collecting regions from said charge storage stages to said CCD output line register and then into said second line store during a second portion of said line trace interval.

9. Apparatus according to claim 8 wherein said first and second line stores concurrently transfer their respective row of charge packets to said differential combiner during the following line trace interval.

10. Apparatus according to claim 1 further including:

optical means aligned with said semiconductor substrate for substantially blocking incident illumination from reaching said photoresponsive charge collecting regions during said line retrace intervals and substantially passing said incident illumination to said photoresponsive charge collecting regions during said line trace periods.

11. An imager system for generating successive samples of video signal during recurrent line trace intervals, interleaved with recurrent line retrace intervals, with suppressed transfer smear in response to incident radiation, said imager system comprising:

a substrate of semiconductor material;

a plurality of CCD charge transfer channels disposed within said semiconductor substrate and at least partially receptive to radiation generated photoresponse charge as may give rise to transfer smear, each CCD charge transfer channel having a plurality of successive charge transfer stages;

a plurality of rows and columns of photoresponse charge collecting regions, each column being aligned on said semiconductor substrate with a respective one of said CCD charge transfer channels, said plurality of charge collecting regions being exposed to respective elements of a radiation image and collecting rows of respective charge packets generated by photoconversion of the respective elements of the radiation image;

output CCD charge transfer means shielded from said incident radiation and disposed within said semiconductor material so as to recurrently receive rows of said charge packets from an end of said CCD charge transfer channels;

means operative during a first portion of said line retrace intervals for transferring a row of charge packets originating from said collecting regions into said output CCD charge transfer means and operative during a second portion of said line retrace intervals for transferring a row of charge packets not originating from said collecting regions, i.e., transfer smear charge packets, into said output CCD charge transfer means; and differential combining means coupled to said output CCD charge transfer means for differentially combining a row of charge packets transferred to said output CCD charge transfer means during said first portion of said line retrace intervals with the row of charge packets transferred into said output CCD charge transfer means during said second portion of said line retrace intervals.

12. An imager set forth in claim 11 wherein:

said first portion comprises substantially the first half of said line retrace interval and said second portion comprises substantially the second half of said line retrace interval.

13. An imager as set forth in claim 11 wherein said output CCD charge transfer means comprises:

a first row of successive charge transfer stages receptive of recurrent rows of charge packets transferred from said ends of said plurality of CCD charge transfer channels; and a second row of successive charge transfer stages receptive of recurrent rows of charge packets transferred from said first row of charge transfer stages.

14. An imager set forth in claim 13 wherein:

said first row of successive charge transfer stages is formed by a storage gate electrode disposed over said ends of said CCD charge transfer channels; and said second row of successive charge transfer stages comprises a CCD output line register.

* * * * *